(12) United States Patent
Bauer

(10) Patent No.: US 10,195,970 B2
(45) Date of Patent: Feb. 5, 2019

(54) DEVICE FOR AIR-CONDITIONING THE BACKREST OR SEAT AREA OF A MOTOR VEHICLE

(71) Applicant: I.G. BAUERHIN GMBH, Gruendau (DE)

(72) Inventor: Stefan Bauer, Alzenau (DE)

(73) Assignee: I. G. BAUERHIN GMBH, Gruendau (DE)

( * ) Notice: Subject to any disclaimer, the term of this patent is extended or adjusted under 35 U.S.C. 154(b) by 613 days.

(21) Appl. No.: 14/803,255

(22) Filed: Jul. 20, 2015

(65) Prior Publication Data

US 2016/0023580 A1   Jan. 28, 2016

(30) Foreign Application Priority Data

Jul. 28, 2014  (DE) .................... 20 2014 005 998 U

(51) Int. Cl.
*B60N 2/56* (2006.01)
*B60N 2/58* (2006.01)

(52) U.S. Cl.
CPC ......... *B60N 2/5628* (2013.01); *B60N 2/5621* (2013.01); *B60N 2/5642* (2013.01); *B60N 2/58* (2013.01)

(58) Field of Classification Search
CPC .. B60N 2/5628; B60N 2/5621; B60N 2/5642; B60N 2/58
USPC ......................................................... 454/120
See application file for complete search history.

(56) References Cited

U.S. PATENT DOCUMENTS

| | | | | |
|---|---|---|---|---|
| 1,356,493 A | * | 10/1920 | Kerr, Sr. ................. | A47C 7/425 297/230.14 |
| 2,992,605 A | * | 7/1961 | Trotman ............... | B60N 2/5635 297/180.14 |
| 4,997,230 A | * | 3/1991 | Spitalnick ................ | A47C 7/74 297/180.11 |
| 5,002,336 A | * | 3/1991 | Feher ..................... | A47C 7/744 297/180.13 |
| 5,370,439 A | * | 12/1994 | Lowe ....................... | A47C 7/74 297/180.11 |
| 5,613,729 A | * | 3/1997 | Summer, Jr. ............. | A47C 7/74 297/180.11 |

(Continued)

FOREIGN PATENT DOCUMENTS

DE        10357583 B3    3/2005
DE     102005039779 A1    2/2007

*Primary Examiner* — Gregory Huson
*Assistant Examiner* — Dana Tighe
(74) *Attorney, Agent, or Firm* — Robert W. Morris; Eckert Seamans Cherin & Mellott, LLC

(57) ABSTRACT

A device for air-conditioning the backrest or the seat area of a motor vehicle seat has an insert that rests in a recess of a cushion component of the vehicle seat. The insert has an air distribution layer that is covered by (a) an upper cover layer at the top side area that points away from the base area of the recess and (b) a lower cover layer arranged at the side of the air distribution layer that points toward the base area of the recess. The lower cover layer has at least one strap section that protrudes beyond the outer circumference of the air distribution layer. This cover layer has a width that corresponds approximately to the thickness of the air distribution layer and rests on a circumferential area of the air distribution layer that is associated with the strap section and at least partly covers this circumferential area.

10 Claims, 9 Drawing Sheets

(56) References Cited

U.S. PATENT DOCUMENTS

| | | | | |
|---|---|---|---|---|
| 5,613,730 A * | 3/1997 | Buie | ................... | B60N 2/5614 |
| | | | | 297/180.11 |
| 5,692,952 A * | 12/1997 | Chih-Hung | ........ | B60H 1/00285 |
| | | | | 297/180.11 |
| 5,924,767 A * | 7/1999 | Pietryga | ................... | A47C 7/74 |
| | | | | 297/180.11 |
| 6,511,125 B1 * | 1/2003 | Gendron | ................ | A47C 7/742 |
| | | | | 297/180.11 |
| 6,786,541 B2 * | 9/2004 | Haupt | ................ | B60H 1/00285 |
| | | | | 297/180.1 |
| 2005/0200179 A1 * | 9/2005 | Bevan | ................... | A47C 7/425 |
| | | | | 297/284.6 |
| 2006/0249996 A1 * | 11/2006 | Eberl | ....................... | A47C 7/74 |
| | | | | 297/180.14 |

* cited by examiner

DEVICE FOR AIR-CONDITIONING THE BACKREST OR SEAT AREA OF A MOTOR VEHICLE

BACKGROUND OF THE INVENTION

The present invention relates to a device for air-conditioning the backrest or the seat area of vehicle seat.

Such an air-conditioning device comprises an insert that rests on a base area of a recess in a cushion component of the backrest or seat area of a vehicle seat, or is placed on the component during the manufacturing process. Such an insert comprises an air distribution layer that can also be referred to as an air distribution "mat". This air distribution layer is covered by a cover layer on the side thereof that points away from the base area of the recess. Using an air movement device that is connected to the air distribution layer, air is supplied to the air distribution layer or removed from it.

An air distribution device for a cushion component in a passenger compartment, in particular for a vehicle seat, is described in DE 103 57 583 B3. This air distribution device comprises an air distribution layer that is placed in a recess in a cushion component of the seat. On the top side thereof, i.e. the side that points away from the base area of the recess, the air distribution layer is covered by an accompanying layer that is sized to extend beyond the base area of the air distribution layer. An adhesion area is located on this extension of the accompanying layer, on the side thereof that points toward the air distribution layer, which is used to glue the accompanying layer to the area of the cushion component that delimits the edge area of the recess.

DE 10 2005 039 779 A1 describes another air distribution device for distribution air in a component in a vehicle passenger compartment, in particular in a vehicle seat. Like the air distribution device described above, this device also comprises an air distribution layer. This air distribution layer is delimited at at least one of its circumferential edges, at least in part, through a delimiting device. The device is not designed integrally with the base section but, rather, designed in part to be separate from the base section.

SUMMARY OF THE INVENTION

The principle objective of the present invention is to provide an air-conditioning device that is easy to manufacture and easy to handle when installing it in a vehicle seat, and by means of which the air can be guided, targeted inside the air distribution layer.

This objective, as well as other objectives which will become apparent from the discussion that follows, are achieved, according to the present indention, by providing an air-conditioning device for a vehicle seat wherein the insert, that is placed in the recess of the cushion component of the seat area or backrest, has a lower cover layer that is arranged on the side pointing toward the base area of the recess and covers the bottom side area of the air distribution layer. Thus, this lower cover layer is located between the base area of the recess and the bottom side of the air distribution layer when the insert is placed into the recess of the seat. In addition, this cover layer has at least one strap section that is formed by a section of the lower cover layer and that extends or protrudes beyond the outer circumference of the insert or beyond the lower area of the air distribution layer that is associated with the base area of the recess; this protrusion refers to the part of the lower cover layer that, when the lower cover layer is viewed as a layout, protrudes beyond the base area of the air distribution layer.

This at least one strap section has at least one width that corresponds approximately to the thickness of the air distribution layer or, with reference to the recess into which the insert is placed, at least the depth of the recess, viewed in the direction perpendicular to the base area of the recess, or perpendicular to the upper or bottom side area of the air distribution layer. When such an insert is inserted into the recess in the backrest or the seat area of a vehicle seat, this strap section rests at the associated circumference area of the air distribution layer such that the respective circumference area of the air distribution layer is covered by this strap section.

One particular advantage of the invention is that this strap section that covers the circumference area does not need to be glued together with the circumference area of the air distribution layer. In order to achieve solid resting of the strap section at the circumference area of the air distribution layer, the circumference dimensions of the recess and the circumference dimensions of the air distribution layer are preferably adapted to each other such that the circumference dimensions of the recess are of equal size or slightly smaller than the circumference dimensions of the air distribution layer. In this manner, the insert can be placed in the recess formfitting or friction-locked without the need to glue the insert at its edge areas on the side and there, via the strap section that covers the side edge area of the air distribution layer, together with the side walls of the recess. Similarly it is not necessary to glue the strap section together with the associated side area of the air distribution layer.

The invention also contemplates placing wedging pieces, for example made of a foam material, between the circumference of the insert and the circumference sides of the recess, and/or to fill such areas in with foam. In certain applications, the strap section of the lower cover layer can also rest at the circumference area of the air distribution layer such that no formfitting or friction-locked connection is formed with this circumference area.

According to the invention, the insert is preferably designed as an area part with four circumference areas, wherein at least two, preferably three of these circumference areas each have an associated strap section.

When such an insert that is covered by the strap section at three of the circumference areas of the air distribution layer is placed into the recess of the seat, the fourth circumference area, which is not covered or only partially covered by a strap section, can be used to create a flow connection to an air moving device. However, it is also provided that all four side areas are covered by such strap sections of the lower cover layer, wherein then the connection to an air moving devices is carried out via a respective opening in the lower or upper cover layer.

In one additional, particularly preferred embodiment, the strap section or the strap sections, respectively, each have a width that is greater than the thickness of the air distribution layer, or the depth of the recess. In this case, the area parts of the strap sections that arise due to the greater width can be used to fold them over onto the associated edge areas that delimit the recess and to affix it with its bottom side that rests on these edge areas to the edge areas, preferably to glue it together with them. For this purpose, appropriate adhesive areas can be provided, for example in the form of a double-sided adhesive tape, on these edge areas that are thus located on the side of the strap sections of the lower cover layer that points away from the air distribution layer. Consequently, in order to attach the insert of the air-conditioning device at the backrest or the seat area of a vehicle seat, it must only be placed in the recess, wherein preferably the size of the insert is adapted to the size of the recess. When placing the insert into the recess, the strap sections rest on the side areas of the recess and/or on the side areas of the air distribution layer and at the same time can also be wedged between the sidewalls of the recess and the side areas of the air distribution layer. The part of the strap sections that protrudes upward beyond the top side of the insert is then only placed onto the area of the cushion component that delimits the edge area of the recess, or of the part in which the recess is formed and is then glued together.

It is also provided, according to the invention, that the insert has a frame that surrounds the air distribution layer at least in part at its outer circumference. In such an embodiment, the lower cover layer with the strap sections are dimensioned such that the strap sections are formed by such parts of the lower cover layer that, when viewed again in the layout of the cover layer, they also protrude beyond the outer circumference of the respective frame portion. In this case, the upper and the lower cover layer can be connected at the frame, namely at the associated upper and bottom sides of the frame, for example glued or sown together with the additional measure that the air distribution layer is placed floating in the space between the cover layers and the frame. A frame that does not surround all sides of the air distribution layer or surrounds the sides only in part is also considered a "frame".

In order to potentially secure the insert additionally in the recess, the lower cover layer can also have areas with an adhesive layer at its area that points away from the air distribution layer. Using this adhesive layer, the insert is glued to the base area of the recess, a measure that may also be advantageous for installing the insert in the seat.

The air distribution layer is preferably made of a knitted spacer fabric, which means by one that comprises an upper fabric layer and a lower fabric layer, which are spaced apart by so-called wales such that an air distribution layer is created in this manner. To reinforce such a knitted spacer fabric in the edge area, the number of such wales of this knitted spacer fabric, which run in one direction perpendicular to the cover layers, in the edge area, at least at two opposite sides, per area unit or spatial unit (when viewed three-dimensionally), are selected larger than in the central area of the knitted spacer fabric.

An additional advantage is provided when one strap section of the lower cover layer is extended at one side of the insert such that it covers at least in part a fan that is placed inside the cushion component. In such an embodiment of the lower cover layer, it is also provided that the strap section that covers the fan at least in part has an opening for a flow connection between the fan and the air distribution layer in the area that rests on the circumference areas of the air distribution layer. With such an embodiment of the lower cover layer, a cover, securing element but also a flow channel can be formed by an area part of the lower cover layer without additional area parts.

However, it shall be noted that the lower cover layer refers not only to the area section that covers the bottom side of the knitted spacer fabric but also to the area sections that in the layout of the lower cover layer are greater than the base area of the air distribution layer. If the lower cover layer is composed of individual area parts, where these area parts are glued together, then such an embodiment is also within the concept of the invention, which can be viewed in that the area of the lower cover layer is enlarged such that strap sections are formed that protrude beyond the base area of the air distribution layer and are turned over such that they cover at least the side areas of the air distribution layer when the insert is placed into the recess.

The lower cover layer, and thus also the strap sections, is preferably made of a thin non-woven that additionally can foe impermeable to air by being provided with a respective coating. However, it is also provided that the nonwoven has such a thickness that it prevents air from penetrating or allows only a negligible amount to penetrate.

For a full understanding of the present invention, reference should now be made to the following detailed description of the preferred embodiments of the invention as illustrated in the accompanying drawings.

DESCRIPTION OF THE PREFERRED EMBODIMENTS

Figure 1A:
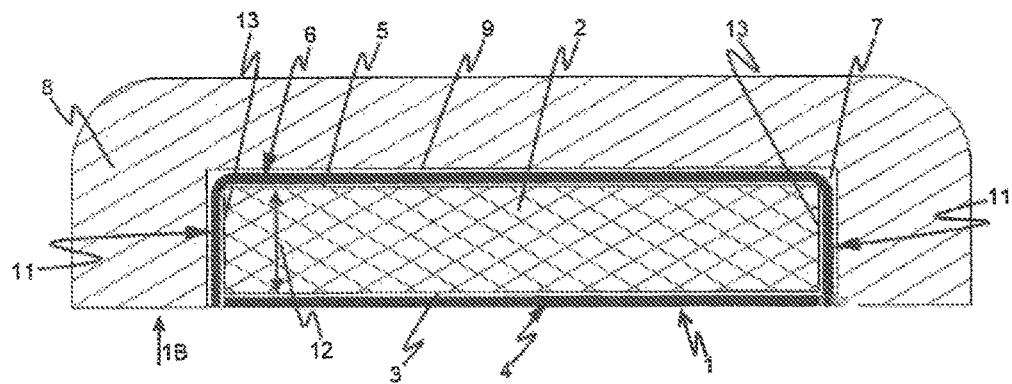
FIG. 1A shows a sectional presentation along the section line 1A-1A in FIG. 1B of a first embodiment of an insert of an air-conditioning device that is placed in a seat area according to the invention.

The preferred embodiments of the present invention will now be described with reference to FIGS. 1-8 of the drawings. Identical elements in the various figures are designated with the same reference numerals.

It is noted expressly that in the description of the various exemplary embodiments below, as presented in FIGS. 1 to 6, not all the components are described anew for an embodiment if they have already been described or explained based on another embodiment. Correspondingly, the description of the various components of an embodiment can be transferred to the respective components of another embodiment without this being mentioned expressly.

The air-conditioning device for air-conditioning the backrest or the seat area of a vehicle seat comprises an insert 1 that has as an essential element an air distribution layer 2, which preferably is a flat mat-shaped element.

Figure 1B:
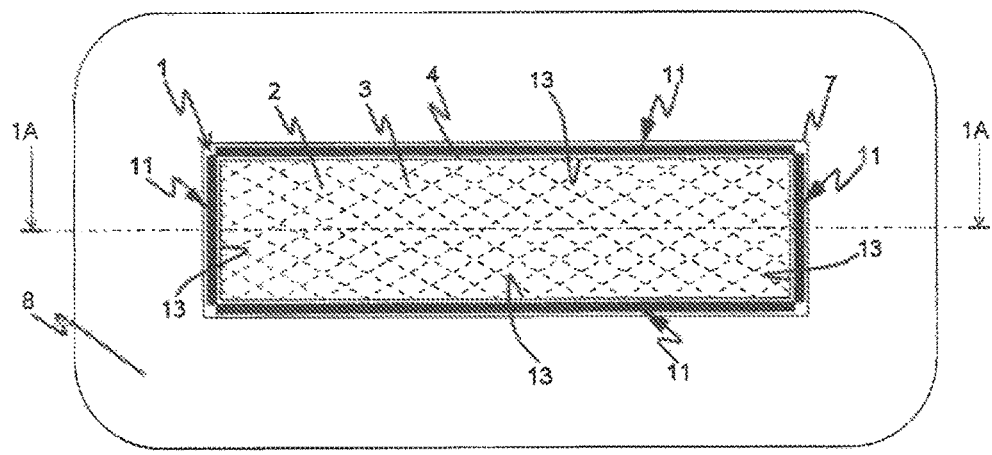
FIG. 1B shows a top view of the arrangement shown in FIG. 1A from the direction of the arrow 1B in FIG. 1A.

The air distribution layer 2 of the insert 1 is, initially with reference to FIGS. 1A and 1B, covered at its top side 3 by an upper cover layer 4 and at its bottom side 5 by a lower cover layer 6.

This insert 1 is placed into a recess 7 of a cushion component 8 such that the insert 1 with its lower cover layer 6 rests on a base area 9 of the recess 7.

In the present description, the top side 3 of the air distribution layer 2 as referenced as that side that points away from the base area 9 of the area in the intended arrangement of the insert 1 in the recess, while the bottom side 5 of the air distribution layer 2 is designated as that side that points toward the base area 9 of the recess 7 or with which the insert 1 rests on the base area 9 of the recess 7.

Figure 5A:
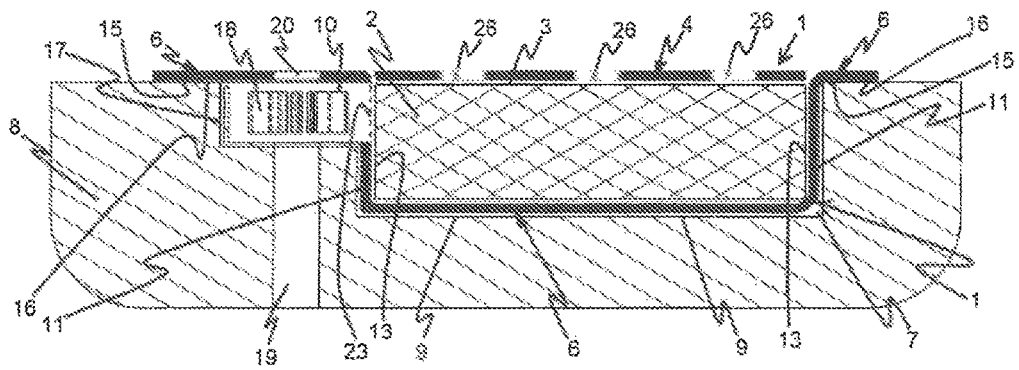
FIG. 5A shows an air-conditioning device with an insert according to a fifth embodiment of the invention in a sectional view along the section line 5A-5A of FIG. 5B that in its basic structure corresponds to that shown in FIG. 5A, however in an arrangement on the A-side of a vehicle seat.

The lower cover layer 6 is thus the area part of the insert 1 that is located between the air distribution layer 2 and the base area 9 of the recess 7. The definition of the upper cover layer 4 or the top side 3 of the air distribution layer 2, respectively, and the definition of the lower cover layer 6 or the bottom side 5 of the air distribution layer 2, respectively, can be applied to the arrangement of the insert 1 at the bottom side of a vehicle seat, or at the rear side of a backrest, also designated as B-side, as shown in FIG. 1A and for the arrangement of an insert 1 on the A-side of a cushion component, which means on that side that points toward a person that takes a seat on the seat, as is shown in FIG. 5A, for example.

The embodiments that are shown in an arrangement on the B-side can be correspondingly transferred to and implemented in an arrangement on the A-side and vice versa without such an arrangement being expressly mentioned or presented. For such an implementation it can be sufficient to rotate the sheet of the drawing correspondingly.

At a suitable location, the air distribution layer 2 is connected to an air movement device that is not shown in FIGS. 1 and 2 since FIGS. 1 and 2 initially serve the purpose of explaining the insert 1 with the special embodiments of the upper cover layer 4 and in particular the lower cover layer 6. However, the air movement device is shown in the additional embodiments as presented in FIGS. 3 to 7 and there designated with the reference sign 10.

A significant part of the invention is that the lower cover layer 6 that covers the bottom side 5 of the air distribution layer 2 has strap sections 11 that are designed as area parts of the lower cover layer 6 and connected to it. Thus, these strap sections 11 are formed by a section of the lower cover layer 6 that protrudes beyond the outer circumference and thus beyond the area of the bottom side 5 of the air distribution layer 2 and has at least a width that corresponds approximately to the thickness of the air distribution layer 2, viewed perpendicular to the base area 9 of the recess 7, indicated by the double-arrow 12 in FIG. 1A and thus also corresponds approximately to the depth of the recess 7.

In the first embodiment of FIG. 1, respective strap sections 11 are provided at all four sides of the air distribution layer 2 or of the insert 1 (designed in rectangular shape), respectively.

When the insert 1 is placed or pressed into the recess 7 of a cushion component 8, the strap sections 11 which are initially oriented in the plane of the lower cover layer 6, or expressed differently in the plane of the bottom side 5 of the air distribution layer 2, will rest at the associated circumference areas 13 of the air distribution layer 2. With an appropriately dimensioned recess 7 and an appropriately dimensioned air distribution layer 2 in such a manner that their dimensions are—at least in essential areas—equal, the strap sections 11 held between the side walls of the recess 7 and the circumference areas 13 of the air distribution layer 2 at least in part formfitting and possibly at least in part friction-locked, without the need for these strap sections 11 to be glued together with the circumference areas 13 of the air distribution layer 2. This is of particular advantage when considering that no gluing process is required when pre-assembling the insert 1 and for placing the insert 1 into the recess 7 of a seat part. Furthermore, gluing together of such strap sections 11 or of any area parts at the side areas of an air distribution layer 2, which are made of a knitted spacer fabric with wales, for example, would have disadvantages in that such loops and wales do not offer a contiguous adhesion area.

Figure 8:
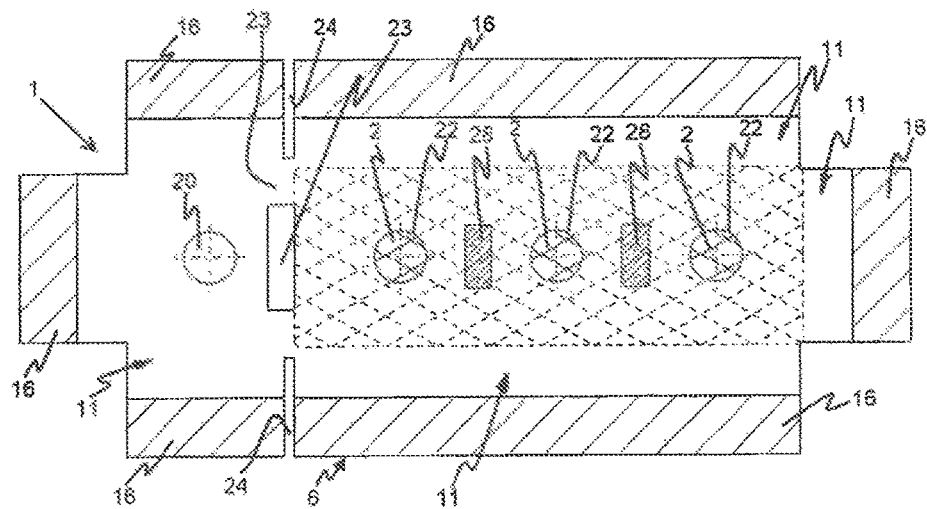
FIG. 8 shows the top view of a layout for a lower cover layer that can foe used, for example, as a cover layer for the insert, or the air-conditioning device, respectively according to the embodiments as presented in FIGS. 4, 5 and 6.

A layout of a lower cover layer 6, as is provided for the embodiment of FIG. 1, can in principle foe recognized also based on the layout that is presented in FIG. 8 for an air-conditioning device as shown in the embodiments in FIGS. 3 to 6.

The Figures are schematic presentations only and not shown to scale for the intended application. This applies in particular to the cushion component 8, which in the Figures is shown only as a section of a cushion structure or of another carrier component of a seat having the recess 7.

Figure 2A:
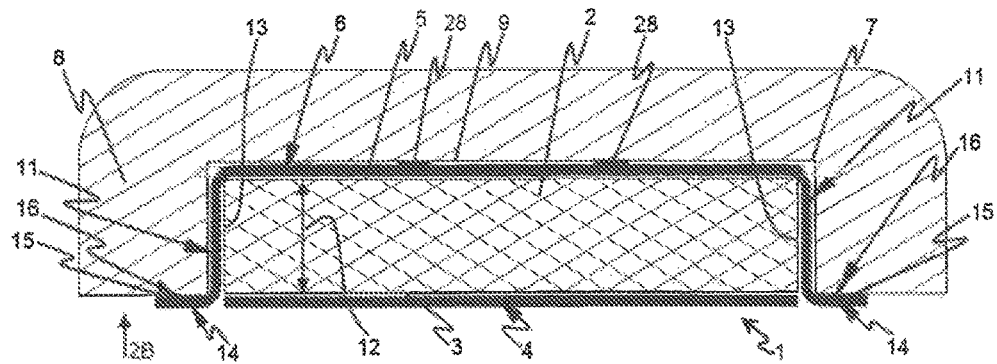
FIG. 2A shows a second embodiment of an insert of an air-conditioning device in a sectional presentation that corresponds to that of FIG. 1A, according to the sectional line 2A-2A in FIG. 2B.
Figure 2B:
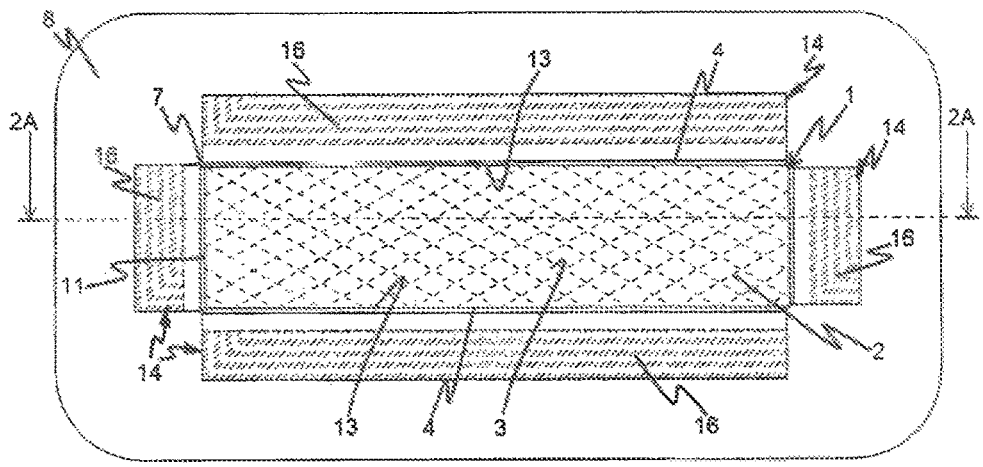
FIG. 2B shows a top view of the arrangement as shown in FIG. 2A from the direction of the arrow 2B in FIG. 2A.
Figure 2C:
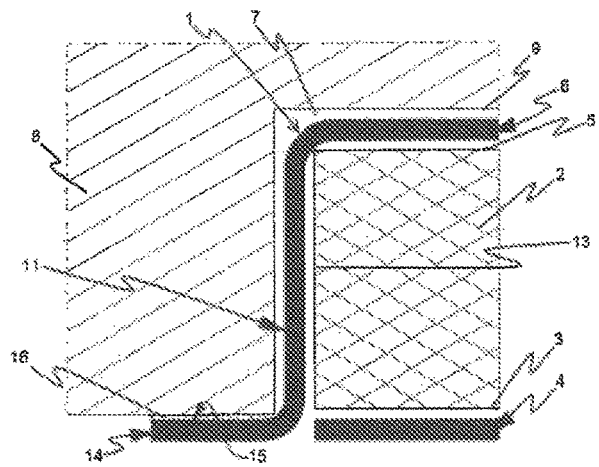
FIG. 2C shows an enlargement of a detail from FIG. 2A with as additional adhesive layer.

The second embodiment presented in FIGS. 2A to 2C corresponds in its structure to the first embodiment of FIGS. 1A and 1B; however, the strap sections 11, seen in the layout of the lower cover layer 6, each designed with a width that is greater than the thickness of the air distribution layer 2 or the depth of the recess 7. When the cover layer 6 is viewed as a flat layout then the width of the strap sections 11 is the dimension of the layout in the direction perpendicular to the folding lines along which the strap sections 11 fold over to the associated circumference areas 13 of the air distribution layer 2.

Due to this greater width of the strap sections 11, the partial areas 14 protruding beyond the edge of the recess can—after the insert is placed into the recess 7—be folded, viewed from the center of the recess 7, over the edge areas 15 that delimit the 7, as illustrated in FIGS. 2A and 2B.

These partial areas 14 are preferably on their bottom side, and thus on the bottom side of the lower cover layer 6, with which the cover layer 6 also rests on the base area 9 of the recess 7, provided with an adhesive area 16, or also an adhesive layer, for example in the form of a double-sided adhesive tape, such that they can be glued together with the edge areas 15 that delimit the recess 7 as shown in a presentation in FIG. 2C, as a detail in FIG. 2A. These adhesive areas 16 are also indicated in FIG. 2B as well as in the subsequent Figures by shaded areas since they are located at the bottom side of the strap sections 11.

While the strap sections 11 are presented in the Figures as continuous edge strips along the respective sides of the air distribution layer 2, they could also be divided into several sections, also with respective empty areas in between, even though a continuous edge strip or strap section 11, respectively, is preferred. Breaks along a strap section 11 can possibly prevent the formation of a fold along the strap section 11.

Figure 3A:
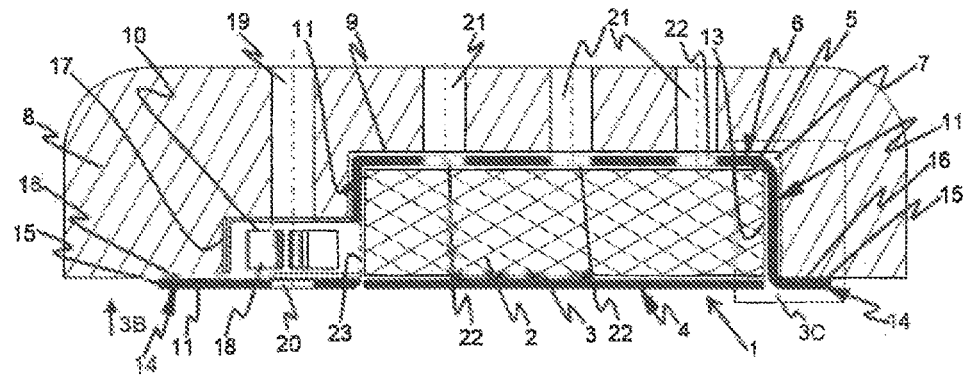
FIG. 3A shows a sectional presentation along the section line 3A-3A in FIG. 3B of an air-conditioning device with an insert according to a third embodiment of the invention.
Figure 3B:
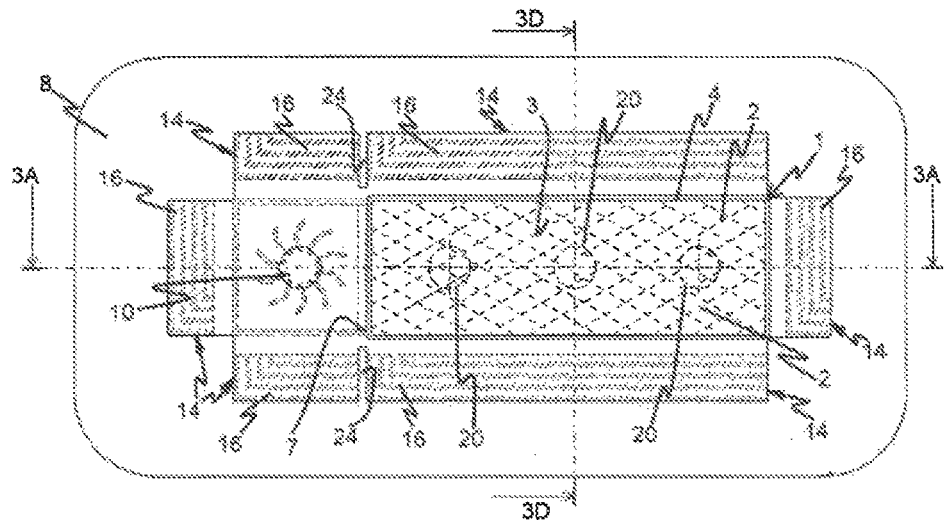
FIG. 3B shows a top view of the arrangement as shown in FIG. 3A from the direction of the arrow 3B in FIG. 3A.

FIGS. 3A and 3B present a third embodiment of the invention showing an air-conditioning device with an insert 1 that corresponds in its basic structure to the insert 1 described above based on FIGS. 1 and 2.

Figure 3C:
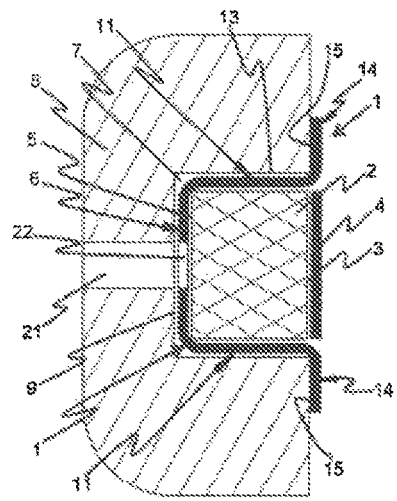
FIG. 3C is a top view of the detail 3C in FIG. 3A showing an additional adhesive layer.

The air-conditioning device as presented in FIGS. 3A, 3B and 3C comprises an air movement device 10 that is placed into an additional recess 17 in the cushion part. Furthermore, the strap section 11, which is a part of the lower cover layer 6, is extended such that it rests on the top side of the cushion component 8 and in this manner covers the fan 18 of the air movement device 10 that is placed into the cushion component 8.

The air movement device 10 is positioned at one of the narrow sides of the air distribution layer 2 such that it supplies or removes air at this side of the air distribution layer 2. For air guidance to the fan 18 or away from the fan 18, an opening 20 is located in the strap section 11 that covers the fan 18, or the air movement device 10, respectively, and a channel 19 is implemented in the cushion component 8 and leads to the top side of the cushion component 8 in the arrangement shown in FIG. 3A. The top side of the cushion component 8 in FIG. 3A is that side that forms the seat area in case of a seat area component or the backrest area in case of an arrangement of the air-conditioning device in a backrest; this arrangement, in which the air-conditioning device with the insert 1 is arranged at the bottom side or the rear side of the cushion component 8 is referred to as B-side arrangement.

In addition, flow channels 21 that lead from the top side of the cushion component 8 essentially vertically to the bottom are located in the cushion component 8 and are connected to the air distribution layer 2 via associated holes 22 in the lower cover layer 6. Depending on the operating mode of the fan 18, air can thus be supplied to or removed from the seat area (top side of the cushion component) via these flow channels 21. Based on FIG. 3A, one can recognize that the fan 18 is connected to the air distribution layer 2 via an opening, or a longitudinal slot 23 that is formed in the strap section 11, respectively. Positioning of this longitudinal slot 23 in the strap section 11 of the lower cover layer 6 can also be recognized in FIG. 8, in the same manner as the opening 20 that is associated with the fan 18 and the holes 22 that are connected to the flow channels 21. The shape or geometry of the longitudinal slot 23 can be adapted to the respective circumstances; the shown rectangular longitudinal slot 23 can also be substituted by several holes in the strap section 11 of the lower cover layer 6.

The strap sections 11 that are associated with the long sides of the air distribution layer 2 and the respective sides of the air movement device 10, are interrupted by a slot 24 in the area that rests on the bottom side of the cushion component 8, such that such partial sections of the strap sections 11 can better rest on the surface of the cushion component 8. The strap sections 11 can be divided into shorter sections by additional slots that are not shown.

Figure 4A:
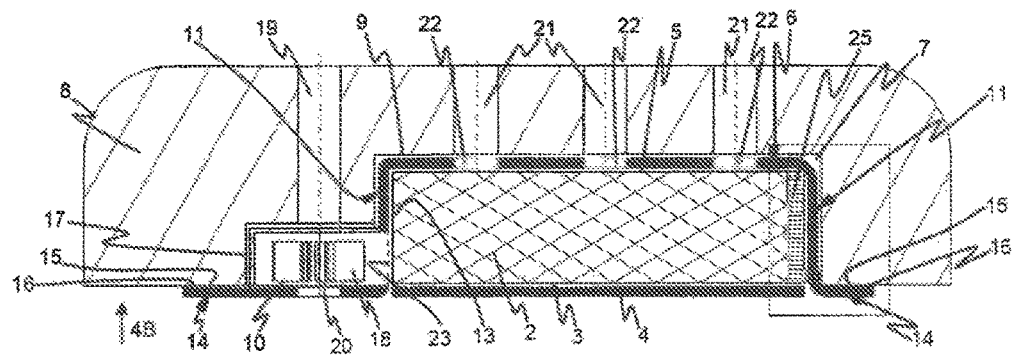
FIG. 4A shows a sectional presentation along the section line 4A-4A in FIG. 4B of an air conditioning device with an insert according to a fourth embodiment of the invention.
Figure 4B:
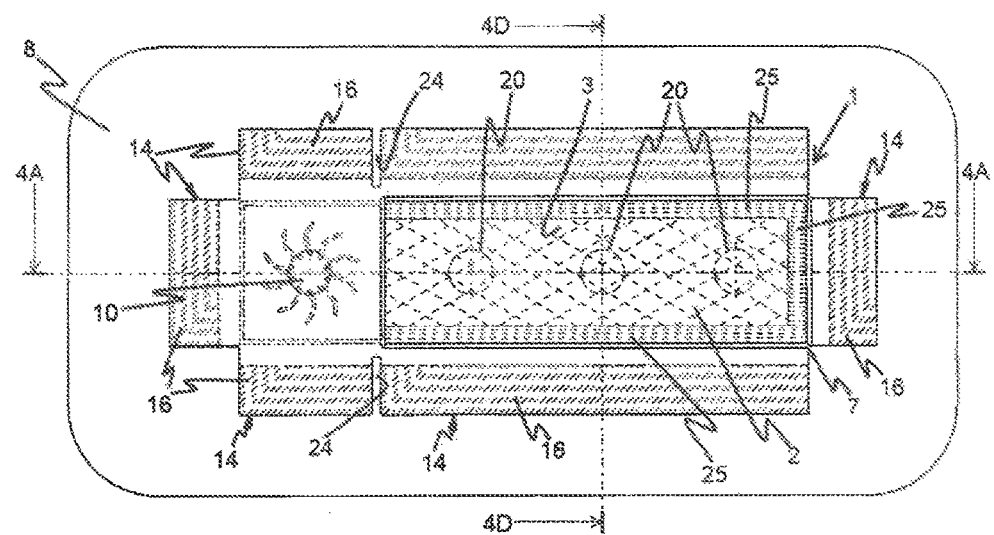
FIG. 4B shows a top view of the arrangement as shown in FIG. 4A from the direction of the arrow 4B in FIG. 4A.
Figure 4C:
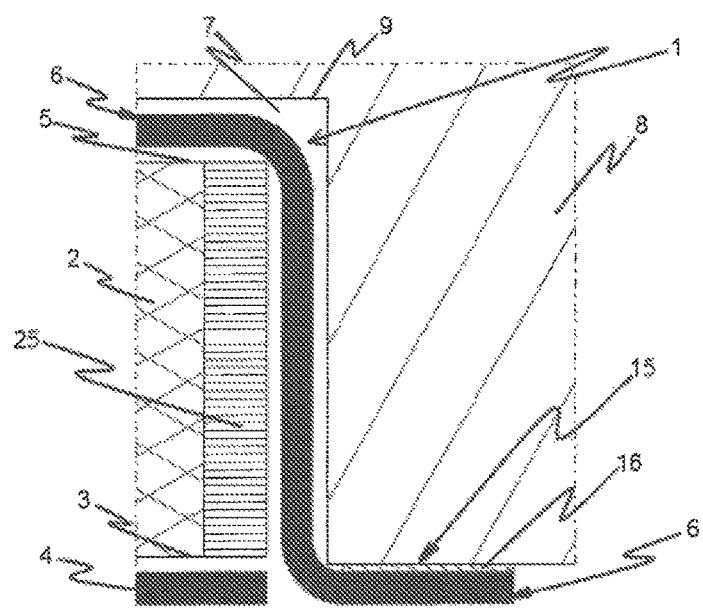
FIG. 4C is a detail view of the detail 4C in FIG. 4A showing an additional adhesive layer.
Figure 4D:
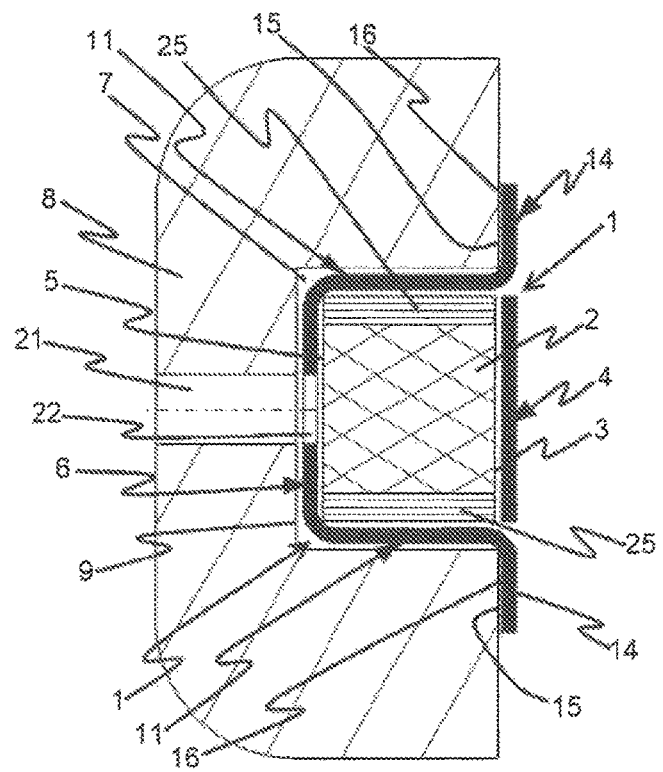
FIG. 4D shows a sectional view according to the sectional line 4D-4D in FIG. 4B.

A fourth embodiment of the air-conditioning device is presented in FIGS. 4A and 4B; this embodiment differs from the third embodiment shown in FIGS. 3A to 3C in that the air distribution layer 2 of the insert 1 is surrounded by a frame at the three outer edge areas. The upper cover layer 4 and the lower cover layer 6 are glued together at this frame 25 and the air distribution layer 2 is placed floating in the space between the cover layers 4, 6 and the frame 25. The frame 25 provides additional stability to the insert 1 and can be made of a foam material. By the fact that the air distribution layer 2 is placed floating, it can, although restricted by the frame 25, move within certain limits such that no tensions arise in the area of the air distribution layer 2 when it is stressed by a person sitting on the seat.

Figure 5B:
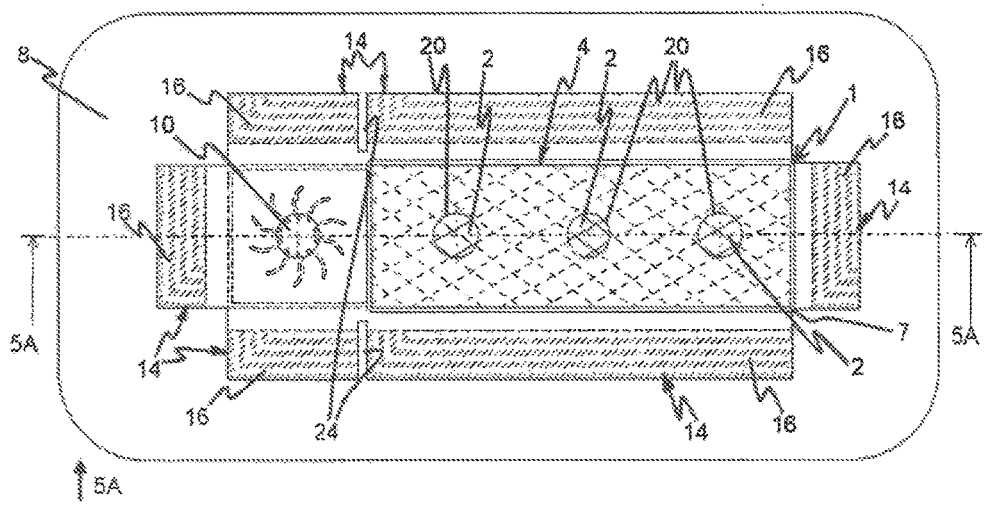
FIG. 5B shows a top view of the arrangement as shown in FIG. 5A from the direction of the arrow 5B in FIG. 5A.

The fifth embodiment of the air-conditioning device, presented in FIGS. 5A and 5B, shows an arrangement on the A-side of the cushion component 8, which means on that side of a seat that is associated with the seat area or with the backrest area. This fifth embodiment corresponds essentially to the third embodiment, presented in FIGS. 3A. and 3B. However, in the fifth embodiment the flow channels 21 are omitted and the air distribution layer 2 is connected to holes 26 in the upper cover layer 4, which in this A-side arrangement is located on the side of the cushion component that points toward the seat area.

Figure 6A:
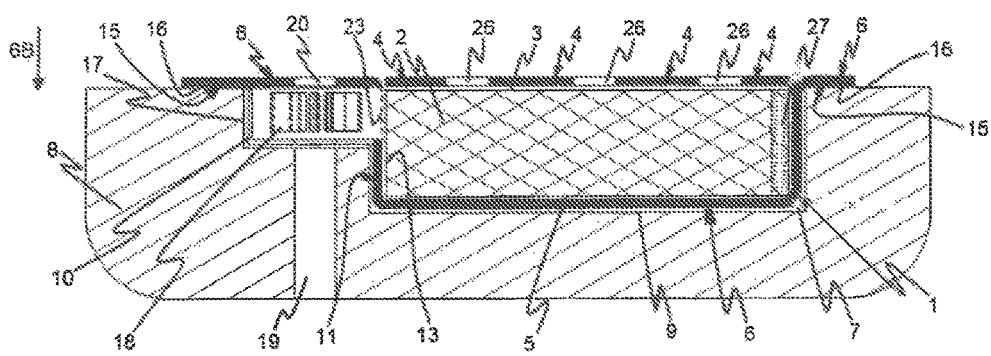
FIG. 6A shows an air-conditioning device with an insert according to a sixth embodiment of the invention in a sectional view along the section line 6A-6A of FIG. 6B that in its basic structure corresponds to that shown in FIG. 5A, however with the additional detail of the insert as also shown in FIG. 4A and in an arrangement of the insert on the A-side of a vehicle seat.
Figure 6B:
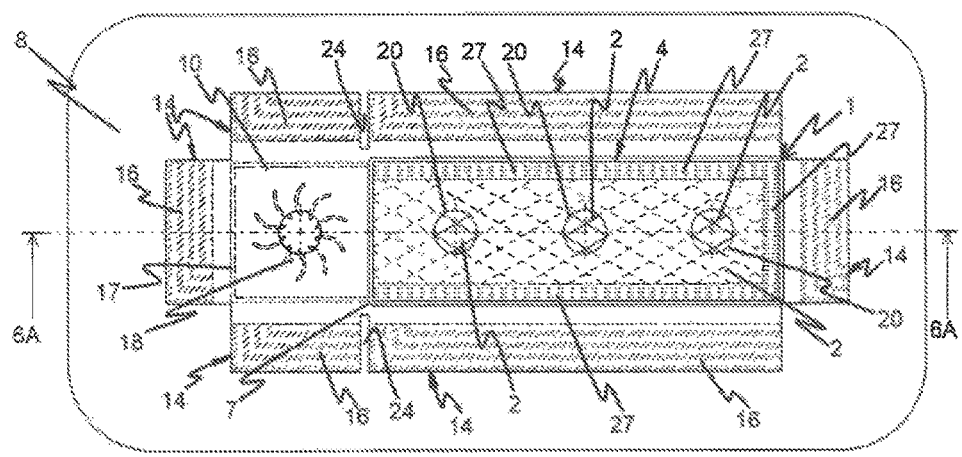
FIG. 6B shows a top view of the arrangement as shown in FIG. 6A from the direction of the arrow 6B in FIG. 6A.

The sixth embodiment of the air-conditioning device as presented in FIGS. 6A and 5B also shows an A-side arrangement that corresponds to that presented in FIGS. 5A and 5B. However, with this sixth embodiment an air distribution layer 2 is shown that is formed by a knitted spacer fabric, where the number of wales per area unit is greater in the edge area than in a central section. This edge area of the wales is designated with the reference sign 27. This greater number of wales in the edge area 27 of the air distribution layer 2 forms a kind of frame that stabilizes the air distribution layer 2 in its edge area 27. One can recognize in FIGS. 6A and 6B that this frame 27 is formed only on three sides of the air distribution layer 2 and not formed on that side of the air distribution layer 2 that is connected to the air movement device 10.

Figure 7A:
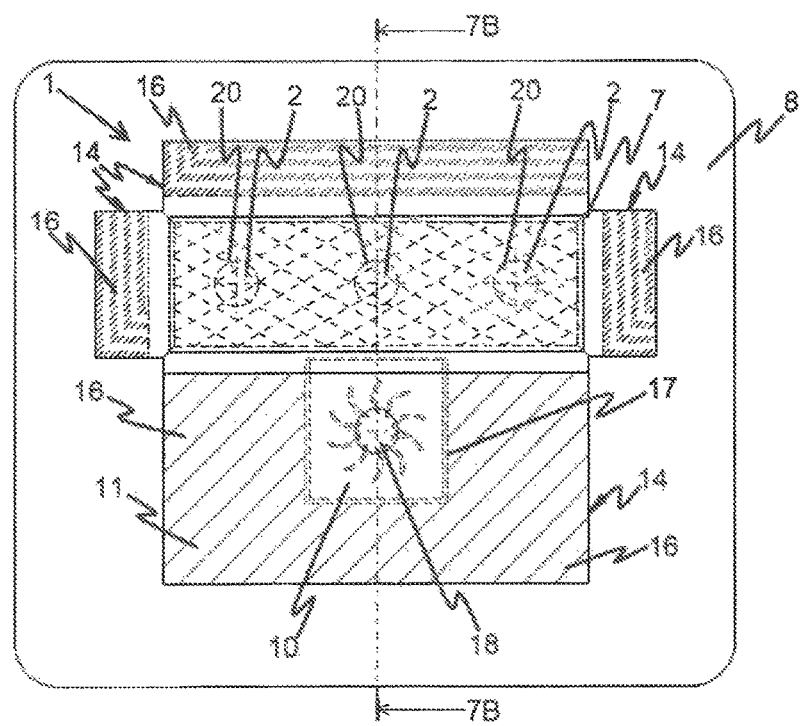
FIG. 7A shows a top view of an air-conditioning device in a seventh embodiment of the invention.
Figure 7B:
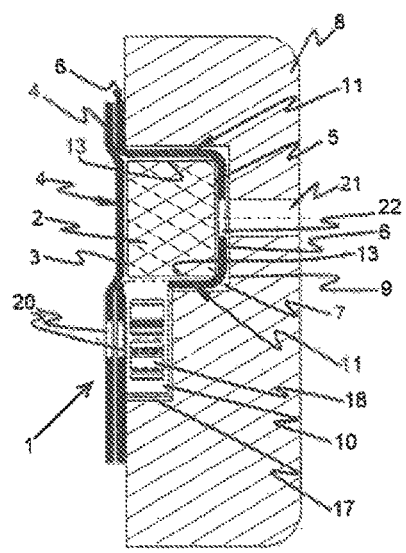
FIG. 7B shows a sectional view according to the section line 7B-7B in FIG. 7A.

While the air distribution layer 2 in the embodiments described above has a rectangular, elongated shape and the air movement device 10 is connected to this air distribution layer 2 at a narrow side, show FIGS. 7A and 7B a seventh embodiment in which the air movement device is arranged at one of the long sides of the air distribution layer 2. The strap section 11 off the lower cover layer 6 associated with this long side in turn is extended such that it covers not only the side areas of the lower cover layer 6 but has a width such that the strap section 11 is placed onto the area of the cushion component that delimits the edge of the recess 7 and is preferably also glued to it thus also covering the area of the air movement device 10. Furthermore, the upper cover layer 4 is extended contrary to the embodiments described above such that it too covers the edge areas of recess 7 and thus also the extended parts of the strap sections 11 as illustrated by the sectional presentation of FIG. 7B and can also be glued to it.

If required, the lower cover layer 6 can be provided with adhesive areas on its bottom side that points away from the air distribution layer 2 and rests on the base area 9 of the recess 7 in order to secure the insert 1 in the recess 7. These adhesive areas 28 are indicated in the layout of the lower cover layer 6 as presented in FIG. 8 and presented in FIG. 2A based on the second embodiment as an example.

There has thus been shown and described a novel device for air-conditioning the backrest or seat area of a motor vehicle which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A device for air-conditioning a cushion of a backrest or seat area component, said insert having an air distribution layer that is covered by an upper cover layer on a top side thereof that points away from said base area, and a lower cover layer arranged on a lower side thereof that points toward said base area, wherein said lower cover layer has at least one strap section formed by a section of the lower cover layer that protrudes beyond an outer circumference of the air distribution layer and has at least a width that corresponds approximately to a thickness of the air distribution layer, and that rests on a circumferential area of the air distribution layer and at least partially covers the circumferential area, wherein the dimensions of the recess and the air distribution layer are equal, such that the at least one strap section is held formfitting between side walls of the recess and the circumference area of the air distribution layer, further comprising a fan unit arranged in the cushion component, and wherein the at least one strap section of the lower cover layer is extended at one side of the insert such that it covers the fan unit at least in part, and wherein the strap section that covers the fan unit at least in part has an opening for a flow connection between the fan unit and the air distribution layer in the area that rests on the circumferential area of the air distribution layer.

2. The air-conditioning device as defined in claim 1, wherein the insert forms an area section with four circumferential areas, and wherein the at least two circumferential areas each have a strap section associated therewith.

3. The air-conditioning device as defined in claim 2, wherein three circumferential areas have a strap section associated therewith.

4. The air-conditioning device as defined in claim 1, wherein the width of each of the strap sections is greater than the thickness of the air distribution layer, wherein at least one adhesive surface is present on at least one partial area of each of the strap sections that is wider than the thickness of the air distribution layer and is located on.

5. The air-conditioning device as defined in claim 4, wherein the at least one partial area of each of the strap sections is glued by means of the respective adhesive surface at area sections of the cushion component that delimit the recess.

6. The air-conditioning device as defined in claim 1, wherein the insert has a frame that surrounds the air distribution layer at least in part, at the outer circumference thereof.

7. The air-conditioning device as defined in claim 6, wherein the upper and the lower cover layer are connected at the frame and wherein the air distribution layer is placed floating in a space between the upper and lower cover layers and the frame.

8. The air-conditioning device as defined in claim 1, wherein the circumferential dimensions of the recess are of equal or slightly smaller size than the circumferential dimensions of the insert.

9. The air-conditioning device as defined in claim 1, wherein the lower cover layer has at least one area with an adhesive layer that points away from the air distribution layer.

10. The air-conditioning device as defined in claim 1, wherein the air distribution layer is formed of a knitted spacer fabric having a number of wales that run in a direction essentially perpendicular to the upper and lower cover layers, in an edge area on at least at two opposite sides thereof, and wherein the number of wales per unit area is greater in the edge area than in the central area thereof.

* * * * *